May 15, 1934.  E. O. BURLING  1,958,531
BELT CLAMP
Filed March 30, 1931
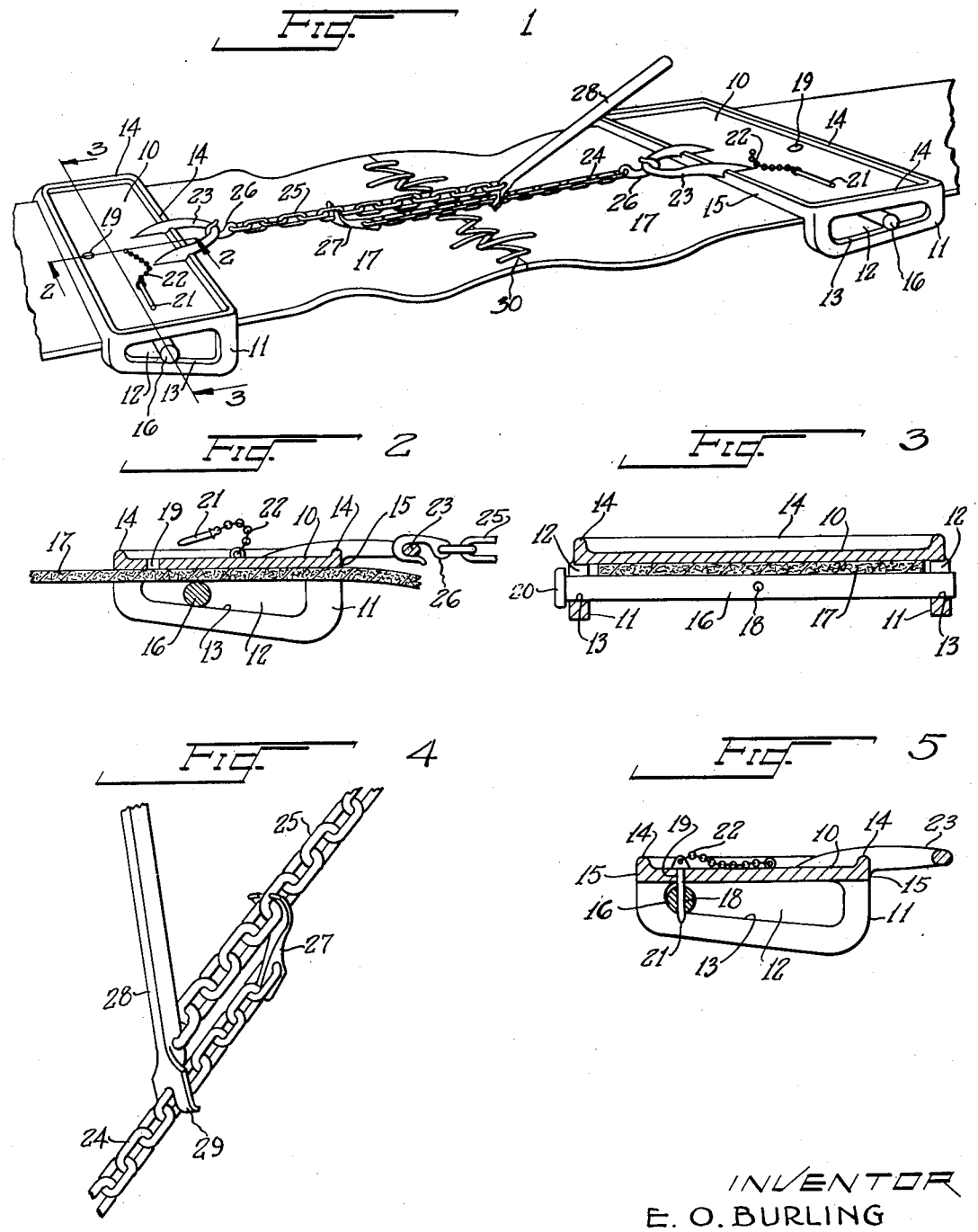
INVENTOR
E. O. BURLING
BY (signature)
ATTORNEY Patented May 15, 1934

1,958,531

UNITED STATES PATENT OFFICE 1,958,531

BELT CLAMP

Eathel O. Burling, Vancouver, Wash.

Application March 30, 1931, Serial No. 526,442

1 Claim. (Cl. 24—171)

This invention relates generally to belt drives for machinery, and particularly to means for holding the ends of the belt together while being spliced.

The main object of this invention is the provision of a belt clamp which may be easily and quickly applied to a belt for the purpose of splicing same when originally installed, or for the purpose of tightening same after it has become loose from use.

The second object is to produce a clamp which will hold the belt entirely across its width without injuring same and without requiring the operation of special fastening means such as bolts or clamps, as is ordinarily the case.

The third object is to provide a novel form of tightener by means of which the clamp sections may be drawn together.

These, and other objects, will become more apparent from the specification following as illustrated in the accompanying drawing, in which:

Fig. 1 is a perspective view showing the device applied to a belt.

Fig. 2 is a vertical section taken along the line 2—2 in Fig. 1.

Fig. 3 is a section taken along the line 3—3 in Fig. 1.

Fig. 4 is a perspective view showing the operation of the chain tightener.

Fig. 5 is a section similar to Fig. 2 but showing the device out of use.

Similar numbers of reference refer to similar parts throughout the several views.

Referring in detail to the drawing, the device includes two clamping members each of which consists of a plate 10 having down-turned sides 11 provided with the tapering slots 12 whose lower faces 13 are inclined with relation to the under side of the plate 10. Stiffening ribs 14 are placed along the top sides of the edges 15.

Transversely across the under side of each plate 10 is placed a roller 16 which may be solid or tubular, but which must have sufficient lateral rigidity to provide the necessary clamping action to hold the belt 17 firmly against the under side of the plate 10. In order to prevent the roller 16 from becoming separated from its clamp when not in use it is desirable to provide same with a hole 18 which registers with a hole 19 in the plate 10 when the roller 16 is at the small ends of the slots 12.

In some instances it will be found desirable to provide a head 20 on one end of the roller 16 which acts as a convenient stop when pushing the roller 16 into position.

A pin 21 is secured to the plate 10 by means of a chain 22 and is dropped through the holes 18 and 19 when the device is not in use. Each plate 10 is provided with an eye 23 along its forward end, which may be integral with the plate 10 or attached thereto, as is most convenient.

The clamp consists of a pair of chains 24 and 25 each of which has a hook 26 attached to one end thereof. The chain 24 has attached thereto on the end opposite the hook 26 a claw 27 adapted to engage the links of the chain 25, and the chain 25 has attached thereto on the end opposite its hook 26 a claw bar 28 adapted to engage the links of the chain 24. By a simple rocking action of the bar 28 and the alternate shifting of the engaging points of the claws 27 and 29 the hooks 26 may be drawn together, and when attached to the eyes 23 may be used to draw the plates 10 of the opposite clamping members together for the purpose of making it possible to produce the splice 30, which may either be in the form of a glue joint in leather belts, or in any other form of splice such as are in common use with leather and fabric belting.

In the operation of this device it is only necessary to place the clamping members in position on the belt 17 and then slip the rollers 16 into position. Obviously, any pull or movement of the plates 10 toward each other will cause the rollers 16 to wedge tightly against the under side of the plate, securely holding the belt portions in order that they may be drawn together under the action of the bar 28.

While the device is preferably made in the form shown, in some instances it may be found desirable to invert the plates 10, placing same on the bottom of the belt 17 causing the weight of the plate to be carried by the roller 16. While not as convenient for the tightening action of the chains it causes the rollers 16 to roll into position and leaves the top side of the belt free for the splicing operation.

Obviously, the manner of using this device will vary with the conditions under which it is employed.

I claim:

A clamp for tightening belts consisting of an open-sided channel member adapted to receive laterally an intermediate portion of a belt between the sides of the channel against its base portion, the sides of said channel having roller raceways formed therein, the sides of each of said raceways converging toward a common end of said channel, a roller removably mounted in said raceways in an endwise direction adapted to be moved toward the belt engaging portion of said channel as said roller is moved toward one end of said raceways, an eye formed on the end of said channel remote from the converging sides of said raceways, said channel having no closure for its open side other than said roller.

EATHEL O. BURLING.